United States Patent [19]

Strobl et al.

[11] Patent Number: 5,132,663

[45] Date of Patent: Jul. 21, 1992

[54] VEHICLE SAFETY SYSTEM AND METHOD FOR MONITORING TOXIC AND COMBUSTIBLE FUELS

[75] Inventors: Wolfgang Strobl, Eichstätt; Klaus Pehr, Stadtbergen, both of Fed. Rep. of Germany

[73] Assignee: Bayerische Motoren Werke Aktiengesellschaft, Fed. Rep. of Germany

[21] Appl. No.: 800,726

[22] Filed: Dec. 3, 1991

Related U.S. Application Data

[63] Continuation of Ser. No. 488,244, Mar. 5, 1990, abandoned.

[30] Foreign Application Priority Data

Mar. 4, 1989 [DE] Fed. Rep. of Germany ....... 3907049

[51] Int. Cl.$^5$ ............................................... B60H 3/06
[52] U.S. Cl. .................................... 340/438; 454/75
[58] Field of Search ............. 340/438, 632; 180/271; 454/75, 156, 158

[56] References Cited

U.S. PATENT DOCUMENTS

| | | | |
|---|---|---|---|
| 3,418,914 | 12/1968 | Finkin | 98/2.01 |
| 4,458,583 | 7/1984 | Fukui et al. | 98/2.01 |
| 4,733,605 | 3/1988 | Holter et al. | 98/2.11 |
| 4,742,763 | 5/1988 | Holter et al. | 98/2.01 |
| 4,875,406 | 10/1989 | Holter et al. | 98/2.01 |
| 4,930,407 | 6/1990 | Holter et al. | 98/2.01 |

FOREIGN PATENT DOCUMENTS

| | | | |
|---|---|---|---|
| 0120753 | 10/1984 | European Pat. Off. | 98/2.01 |
| 2903643 | 8/1980 | Fed. Rep. of Germany | 98/2.01 |
| 3505670 | 8/1986 | Fed. Rep. of Germany | |

OTHER PUBLICATIONS

On-Board Fuel Storage and Supply System of a Liquid Hydrogen Powered Experimental Passengers Car; H. Fieseler, W. Hettinger, M. Kesten; pp. 1 through 8; FIGS. 1-13, Dec. 1988.

*Primary Examiner*—Jin F. Ng
*Assistant Examiner*—Brian R. Tumm
*Attorney, Agent, or Firm*—Evenson, Wands, Edwards, Lenahan & McKeown

[57] ABSTRACT

A vehicle and method for detecting the formation of ignitable mixtures in the closed spaces of the vehicle has at least one signal-generating sensor mounted in the closed spaces of the vehicle at a point at which, because of the physical characteristics of the fuel and because of the spatial conditions, harmful substances and/or gases collect first. The signals generated by the at least one sensor are processed in an electronic circuit which, as a function of the measured harmful-substance or gas concentration, actuated movable vehicle parts for closing and opening certain vehicle spaces.

22 Claims, 2 Drawing Sheets

VEHICLE SAFETY SYSTEM AND METHOD FOR MONITORING TOXIC AND COMBUSTIBLE FUELS

This application is a continuation of Ser. No. 488,244, filed Mar. 5, 1990, now abandoned.

BACKGROUND AND SUMMARY OF THE INVENTION

The invention relates to a safety system and method for a vehicle using a toxic and/or combustible fuel which can form an ignitable mixture with ambient air and, more particularly, to a vehicle safety system which uses sensors mounted in closed spaces of the vehicle to measure fuel concentrations at points where harmful gases collect and to generate signals for opening and closing certain spaces in the vehicle to dissipate the concentrations.

The use of gas sensors in passenger compartments is known, for example, from DE-OS 35 05 670. However, these gas sensors are designed to shut off the air supply to the vehicle interior when an increased concentration of harmful substances exists outside the vehicle. Such sensors do not take into account that fuels carried in the vehicle gas tank may emerge from the tank and form toxic and/or inflammable gas concentrations in the vehicle interior or in the trunk.

It is an object of the present invention to provide a vehicle safety system and method which increases the operating safety of the vehicle and protects particularly against the formation of combustible gas concentrations in the closed spaces of the vehicle.

The foregoing object is achieved in accordance with the present invention through the provision of at least one sensor mounted in the closed spaces of the vehicle at a point which, because the physical characteristics of the fuel as well as of the spatial conditions of the vehicle, harmful substances and/or gases collect initially, and at least one sensor for measuring the harmful substance concentration in the outside or ambient air such that the sensors generate signals which through conventional electronic control circuitry can be used to open and close vehicle spaces depending upon the type of harmful substance or gas concentration.

By virtue of the safety system of the present invention, large amounts of fuel which, together with the ambient air, form a combustible mixture in closed spaces, may be discharged relatively rapidly and without danger into the ambient air where they become harmless very rapidly.

By avoiding a total encapsulation of the fuel system and a gastight encapsulation of the passenger compartment, significant advantages are achieved with respect to cost and weight. The sealing off of the passenger compartment with respect to the trunk takes place as a result of weighing costs and benefits.

The safety system of the present invention is useful particularly in cases where the fuel cannot be detected by human sensory organs, for example, in the case of hydrogen which is tasteless, odorless and colorless. In addition, in comparison with conventional hydrocarbon-containing fuels, hydrogen has a substantial safety disadvantage because of its wide ignition range in air and low ignition energy. As a result of the supply of fresh outside air into the otherwise essentially closed spaces of the vehicle, i.e., the passenger compartment and the trunk, the hydrogen concentration in the vehicle spaces remains, on the average, below the lower ignition limit which is at approximately 4% hydrogen in air.

Since hydrogen is approximately 15 times lighter than air and therefore has a corresponding rise rate or lift, a sensor is arranged in accordance with the present invention above the fuel tank in the passenger compartment at the ceiling and in the trunk proximate to the fuel tank at the highest point of the trunk covering. If the escaping fuel will form a gas in the ambient air which is heavier than air, however, the sensors should be arranged in proximity to the vehicle floor.

The safety system of the present invention may also be used where the outside air surrounding the vehicle has a high concentration of harmful substances so that the protection device of the subject safety system automatically, as a function of the oxygen content in the passenger compartment, temporarily closes the inlet and outlet ventilation openings of the vehicle when a permissible concentration of harmful substances is exceeded. Furthermore, ventilation of the passenger compartment or of the trunk may be increased by using a fan or a ventilator.

Simultaneously with the fresh air supply into the otherwise closed spaces of the vehicle, the fuel removal from the tank of the leaky fuel supply system is shut off and changeover can occur to a second fuel supply system. As a result of changing over to a second fuel supply system, it is possible with the present invention to steer the vehicle without any power disruption out of a possible danger zone.

In order to avoid the risk of explosion in the case of collisions, an acceleration sensor is arranged at the vehicle which, when an impermissibly high acceleration is exceeded, emits a signal by way of an electronic circuit and appropriate control devices, unlocks the doors and opens the side windows, the sliding roof, and the trunk lid.

It is also an advantage of the present invention that, in the case of an excessive deformation of the vehicle rear, the trunk lid will open up without any use of driving motors and solely as a result of trunk lid construction. This opening may be achieved, for example, by a special design of the trunk lid lock which may, have a predetermined breaking point and/or in which the locking part is swivelled in the direction of the passenger compartment in the case of an excessive deformation. Other constructional alternatives include the shape of the trunk lid and the arrangement of springs at the pivotal connecting points of the trunk lid.

It is also an advantage that a battery used as voltage supply point for the safety system is not excessively drained by the protection device so that the protection device can operate continuously even during fairly long stoppage or parking times of the vehicle. Should for any reason the supply voltage fall below a selected value, the trunk lid, the side windows, the sliding roof, etc., will be opened automatically.

In order to draw the driver's immediate attention to the occurrence of critical gas concentrations, the protection device has visual and acoustic warning devices. These warning signals may, however, be emitted as early as before the opening of the windows, etc., so that undesired reflex actions by the driver are avoided. Correspondingly, at the start of the ventilation of the passenger compartment, the rear side windows may be opened first.

The components of the electronic circuit used for controlling the safety of the present invention are relatively small and easy to handle so that a simple and compact housing of the circuit components in the interior of the vehicle is possible. It is also an advantage that the safety system can easily be connected to the cable harness and the electronic system of the vehicle so that no additional lines must be laid for the control, for example, of the electric motors for the actuation of the sliding rood or of the windows.

In addition, the vehicle contains a valve block which is arranged outside the tank and which comprises all solenoid valves and flap valves required for inertization, refueling and engine supply. As a result of the arrangement of a valve block outside the tank, the entering of heat into the tank is minimized and servicing is facilitated. In addition, short line lengths between the valves reduce dead spaces where dirt may collect, and furthermore, the short line lengths reduce evaporation losses during the refuelling operation. Finally, gaseous hydrogen can be discharged into the open air by way of the valve block.

BRIEF DESCRIPTION OF THE DRAWINGS

These and further features, objects and advantages of the present invention will become more apparent from the following detailed description of a presently preferred embodiment when taken in conjunction with the accompanying drawings wherein.

DETAILED DESCRIPTION OF A PRESENTLY PREFERRED EMBODIMENT

Figure 1:
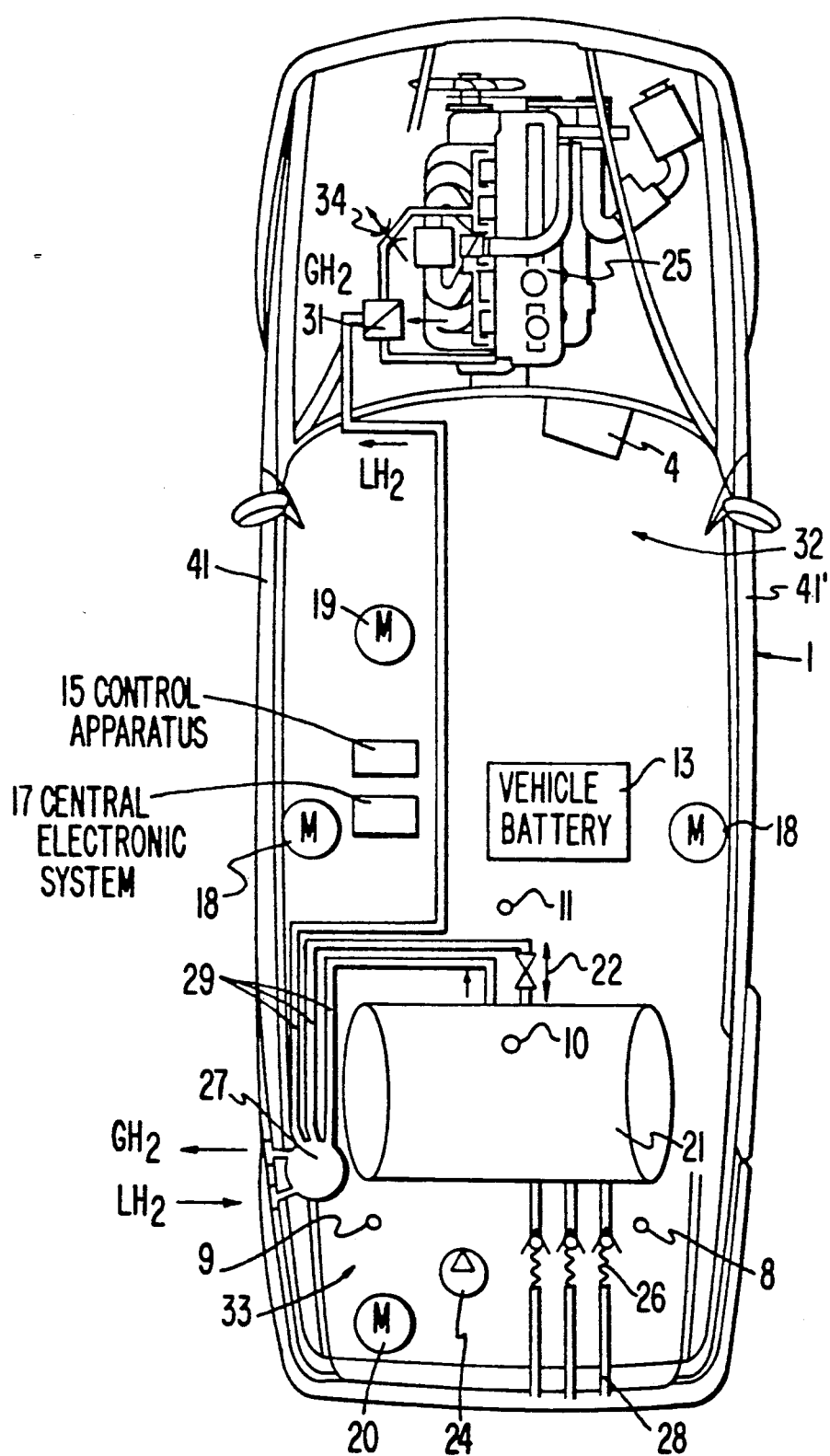
FIG. 1 is a plan view of a vehicle in which the basic construction of the safety system of the present invention is shown.

Referring now to the drawings and, in particular, to FIG. 1, there is shown a vehicle 1 that is powered by hydrogen fuel. Because of the required volume of fuel and the needed collision safety, a fuel tank 21 is installed above the rear axle in the trunk of the vehicle. In the present embodiment, the fuel tank 21 contains liquid hydrogen. In order to avoid refrigeration losses, the tank has a double wall and is vacuum superinsulated. For reasons of safety and strength, the tank has a cylindrical shape. The entering of residual heat which occurs notwithstanding the provision of expensive insulation, residual heat enters the tank and causes a continuous evaporation of the liquid hydrogen. As a result, in the case of a parked vehicle, maximally 2% of the charge of liquid hydrogen is released per day to the environment by way of overflow and safety valves 26, the overflow and safety valves 26 being installed in lines 28 leading to the rear of the vehicle. Additional lines 29 are connected to the fuel tank 21 which, on the one hand, are used for the refuelling the vehicle and for the removal of liquid hydrogen and, on the other hand, for the release of the evaporated hydrogen caused by residual heat.

In direct proximity to the fuel tank 21, an electrically operable valve 22 is operatively arranged for blocking the fuel tank 21 in an emergency. One of the lines 29 connected to valve 22 leads to a vacuum insulated valve block 27 which comprises all solenoid valves and flap valves required for inertization, refueling and engine supply. In another embodiment shown in dashed lines designated by numeral 41 in FIG. 2, the valve 22 can be arranged in the valve block 27.

Hydrogen-carrying components which are disposed at the outer shell of the vehicle 1, such as safety valves and fuel nozzles, are connected with the fuel line system by flexible elements in order to be able to compensate for deformation. The fuel line system between the valve block 27 and an engine 25 is mounted at the vehicle underbody by vehicle supports devised to protect the system as much as possible from collisions and from mechanical damage, such as stones thrown up from the road. The very cold liquid hydrogen fuel is conveyed through a cooling-water hydrogen heat exchanger 31 by means of the tank pressure and there is evaporated and fed to a central metering valve 34 of known construction which is operated electrically. The metering valve 34 forms a compact unit with the distributor system for the injection into each individual suction pipe, so that the risk of hydrogen leakage is largely excluded.

Since hydrogen is a combustible gas and has its lower ignition limit at a concentration of approximately 4% hydrogen in air, sensors 8, 9, 10 for detecting hydrogen are arranged in the trunk 33 as well as in the passenger compartment 32. Because of the physical characteristics of the gas and of the shape of the vehicle closed space, the sensors 8, 9, 10 are arranged at locations where accumulations of gas concentrations are most likely to form first. Since hydrogen is approximately 15 times lighter than air, emerging hydrogen rises or lifts upwards relatively fast. Nests of hydrogen are therefore as a rule formed above the fuel tank 21 at the highest point of the trunk or of the passenger compartment. In the illustrated embodiment, the sensor 10 is arranged in the passenger compartment 32 at the upper end of the rear window (not shown) approximately along the vehicle center line. Correspondingly, the sensors 8 and 9 are mounted in proximity to the fuel tank 21 in the trunk. Sensor 9 is fixed in proximity to the valve block 27 at one side of the fuel tank 21 disposed in the transverse direction of the vehicle. Sensor 8 is detachably held to a rod so that the sensor 8 can also be used by being detached from the rod to examine the tightness of connections of the hydrogen-carrying components, particularly, the lines 28 and 29.

Figure 2:
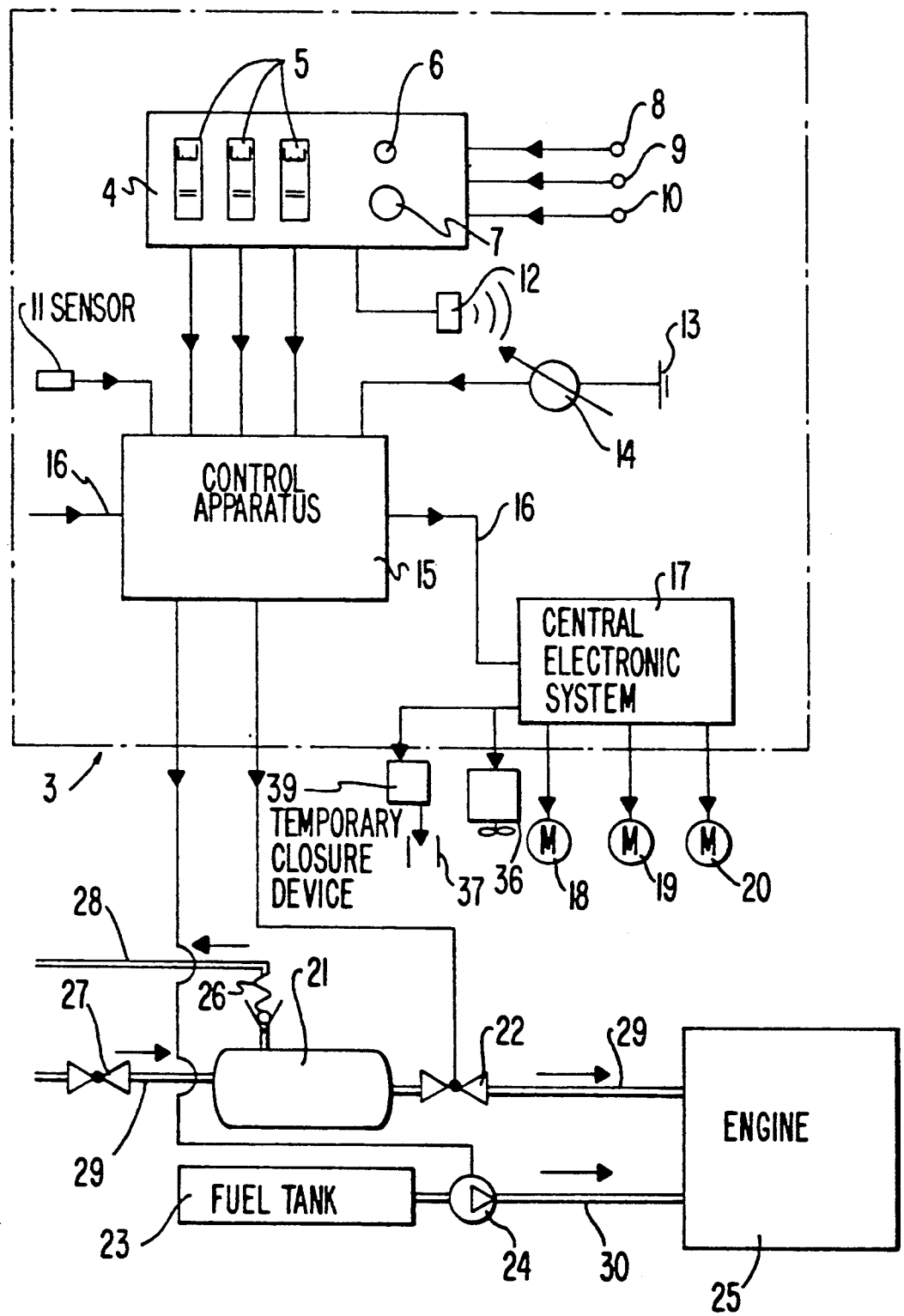
FIG. 2 is a circuit diagram of the safety system shown in FIG. 1.

FIG. 2 also shows the more significant parts of a protection device which comprises an electronic circuit designated in general by the numeral 3 (the dot-dash line) and the adjusting motors 18, 19 and 20 which can be actuated by the electronic circuit 3 in the case of danger as well as the aforementioned electrically operable valve 22 and a gasoline pump 24. The electronic circuit 3 has a display and warning apparatus 4 which is situated in the visual range of the driver at the dashboard. The warning apparatus 4 receives signals from the sensors 8, 9 and 10 continuously or at short time intervals. The signals are processed in the warning apparatus 4 such that, corresponding to an adjustable gas concentration value, signals are emitted to a control apparatus 15. The indicated limit value is clearly below the explosion limit. However, this limit value must not be adjusted to be too low because otherwise, as a result of gases, such as gasoline vapors, contained in the ambient air, the warning apparatus 4 would respond unnecessarily and would trigger the measures described further below. The values measured by the sensors 8,9 and 10 are each indicated on a display 5. For the prewarning of the driver, a warning light 7 as well as a horn 12 are mounted at the warning apparatus 4. In addition, the warning apparatus 4 has an acknowledge key or reset key 6.

When the adjusted limit value is exceeded, the warning apparatus 4 emits signals to a control apparatus 15 which is connected by means of a plug-type connection into the motor cable harness 16 located in the vehicle. The control apparatus 15 simulates the pressing of actuating switches so that automatically, by way of a central electronic system 17 of the vehicle body situation in the vehicle 1 and connected to the control apparatus 15, motors 18, 19 and 20 are actuated for the opening or closing of the side windows, of the sliding roof and of the trunk lid. In order to avoid undesirable reflex actions by the driver, the rear windows are opened or closed first and the adjusting motors for the front windows are not actuated. For the ventilating of the vehicle interior, it may be possible to automatically fold open the rear window shelf and in the case of danger, this rear window shelf may be opened together with the trunk lid. For determining the concentration of harmful substances or gases caused by outside air, a sensor 35 may also be arranged in the intake duct of the heating and/or ventilating system 36 and be connected to the electronic circuit 3.

If the adjusted hydrogen concentration limit is exceeded, for example, in the passenger compartment 32 during the driving operation or during stopping period, the windows and the sliding roof will be opened. During the driving operation, the control apparatus 15, at the same time, emits a signal to the valve 22 arranged at the fuel tank 21 by means of which the valve 22 is closed. Simultaneously, an automatic changeover of the engine operation takes place to a conventional fuel tank 23 by starting the operation of the pump 24 so that the vehicle can be steered out of a possible danger zone without any power breakdown.

If an excessive hydrogen concentration occurs in the trunk 33 of the vehicle 1, the sensors 8 and/or 9 will respond and the trunk lid will be opened in gaps automatically by the motor 20.

In order to prevent dangerously high hydrogen concentrations in the case of a serious traffic accident as a result of damage to the fuel system, a sensor 11 is fastened to the vehicle body which can recognize an excessive vehicle acceleration. In the case of an impact, the sensor 11 emits signals to the control apparatus 15 which, by means of the central electronic system 17 of the body and the motors 18, 19 and 20 actuated by it, opens the side windows, the sliding roof and the trunk lid. The doors 41, 41' which are part of a central locking system are also automatically unlocked by a conventional automatic locking device. In addition, as described above, the valve 22 is closed.

The trunk lid lock, the structure of the trunk lid and the springs at the pivotal connecting points of the trunk lid are constructed such that, in the case of an excessive deformation of the rear part of the vehicle, without any additional introduction of energy, a gap is opened up automatically in the direction of the ambient air. For example, the trunk lid lock may be provided with a predetermined breaking point and/or be constructed as a door lock latch which automatically moves out of the locking position in the case of an excessive deformation.

The power supply of the protection device takes place by way of a vehicle battery 13. A voltage measuring device 14 is connected into the power circuit to the control apparatus 15. The complete protection device is configured so that the electric power consumption is sufficiently low to allow the continuous operation of the protection device during vehicle parking periods of up to two weeks. When a certain supply voltage value is exceeded, which value is measured by the interconnected voltage measuring device 14, the windows, the sliding roof and the trunk lid are opened automatically.

When a harmful substance and/or gas concentration in the passenger compartment 32 caused by the outside air is exceeded as measured by the above-described sensor arranged in the intake duct of the ventilating system, the windows, the sliding roof as well as the other outside-air inlet openings 37 are closed temporarily by a temporary closure device 39 as a function of the oxygen content in the passenger compartment.

While we have shown and described a presently preferred embodiment in accordance with our invention, it is to be understood that the same is susceptible of changes and modifications as will now become apparent to one skilled in the art. Therefore, we do not intend to be limited to the details shown and described herein but intend to cover all such changes and modifications as are encompassed by the scope of the appended claims.

What is claimed:

1. A vehicle comprising at least one fuel supply system which contains a fuel, at least one sensor for measuring a concentration of unburnt fuel escaping from the fuel supply system and operatively arranged in at least an upper portion of a vehicle compartment, said compartment being opened and closed by movable parts at a point when, because of physical characteristics of the unburnt fuel as well as of the vehicle compartment spatial conditions, a concentration of the unburnt fuel initially collects, and circuitry operatively connected between the at least one sensor and the movable parts associated with the compartment, wherein, when the at least one sensor generates signals above a specified level of the unburnt fuel, the movable parts are actuated between opening and closing of the compartment.

2. A vehicle according to claim 1, wherein the at least one sensor is operatively arranged in a trunk of the vehicle in proximity of a tank of the fuel supply system.

3. A vehicle according to claim 1, wherein adjusting means are operatively connected with the circuitry and the movable parts for opening the compartment sufficiently widely where the concentration caused by escaping fuel occurs.

4. A vehicle according to claim 1, wherein at least one of fans and ventilators are provided for ventilating the compartment and operatively arranged to be switched on by the circuitry.

5. A vehicle according to claim 1, wherein said at least one sensor is arranged in proximity to a fuel tank of the fuel supply system for checking the tightness of the tank.

6. A vehicle according to claim 5, wherein the circuitry is operatively arranged to shut off fuel removal from the tank in case of occurrence of the concentration of escaping unburnt fuel.

7. A vehicle according to claim 5, wherein one of the at least one sensors arranged in proximity to the fuel tank is detachably mounted at the vehicle.

8. A vehicle according to claim 1, wherein the vehicle compartment is a passenger compartment, and the at least one sensor in the compartment is arranged substantially at the vehicle centerline.

9. A vehicle according to claim 1, wherein at least one acceleration sensor is arranged at the vehicle for generating signals responsive to an excessive acceleration and is operatively connected to the circuitry.

10. A vehicle according to claim 9, wherein, in response to a signal of the at least one acceleration sensor, the circuitry actuates the movable parts in the same manner as in the case of the occurrence of the concentration of escaping unburnt fuel and further causes an unlocking of vehicle doors.

11. A vehicle according to claim 1, wherein in the case of an excessive deformation of a rear portion of the vehicle, a trunk lid of the vehicle is configured so as to open up.

12. A vehicle according to claim 1, wherein the circuitry is continuously operational at low electric power consumption such that the signals can be generated and the movable parts actuated during long vehicle parking hours.

13. A vehicle according to claim 1, wherein the circuitry is configured to automatically open up the compartment which is closed when a supply voltage falls below a certain value.

14. A vehicle according to claim 1, wherein the circuitry includes a display for showing the measured fuel concentrations, and a warning device.

15. A vehicle according to claim 14, wherein the warning device provides a visual warning.

16. A vehicle according to claim 14, wherein the warning device provides an acoustic warning.

17. A vehicle according to claim 14, wherein the warning device provides a visual and an acoustic warning.

18. A vehicle according to claim 1, wherein the circuitry includes a control apparatus connected with a central electronic system in the vehicle.

19. A vehicle according to claim 1, wherein the fuel supply system includes a fuel tank, and a valve block is arranged in proximity to the fuel tank and contains valves required for the inertization, refuelling of the tank and engine fuel supply.

20. A vehicle according to claim 1, wherein a second fuel supply system is provided in the vehicle and is independent of the first fuel supply system.

21. A vehicle according to claim 20, wherein the circuitry is operatively arranged to change over to the second fuel supply system when the first fuel supply system is shut off to prevent power interruption of an engine of the vehicle.

22. A vehicle according to claim 20, wherein the second fuel supply system contains a conventional fuel which flows to the engine via an electrically controllable pump and a line.

* * * * *